US012568966B1

(12) United States Patent
Modgi et al.

(10) Patent No.: US 12,568,966 B1
(45) Date of Patent: Mar. 10, 2026

(54) AQUEOUS BIOCIDAL COMPOSITION

(71) Applicant: Sanjay Venkatesh Modgi, Pune (IN)

(72) Inventors: Sanjay Venkatesh Modgi, Pune (IN);
Sunil Pratap Bhonsle, Pune (IN);
Savita Sanjay Modgi, Pune (IN)

(73) Assignee: Sanjay Venkatesh Modgi, Pune (IN)

( * ) Notice: Subject to any disclaimer, the term of this
patent is extended or adjusted under 35
U.S.C. 154(b) by 0 days.

(21) Appl. No.: 19/224,111

(22) Filed: May 30, 2025

Related U.S. Application Data

(63) Continuation of application No.
PCT/IB2025/054529, filed on Apr. 30, 2025.

(51) Int. Cl.
*A01N 41/10* (2006.01)
*A01N 25/02* (2006.01)
*A01P 7/04* (2006.01)

(52) U.S. Cl.
CPC ............. *A01N 41/10* (2013.01); *A01N 25/02*
(2013.01); *A01P 7/04* (2021.08)

(58) Field of Classification Search
CPC ............ A01N 41/10; A01N 25/02; A01P 7/04
See application file for complete search history.

(56) References Cited

U.S. PATENT DOCUMENTS

| | | |
|---|---|---|
| 2019/0037838 A1 | 2/2019 | Klostermann et al. |
| 2022/0272980 A1 | 9/2022 | Rodriguez et al. |

FOREIGN PATENT DOCUMENTS

| | | |
|---|---|---|
| CN | 102159071 A | 8/2011 |
| NZ | 730867 B2 | 1/2024 |
| WO | 2012104369 A1 | 8/2012 |
| WO | 2022249204 A1 | 12/2022 |
| WO | 2024243419 A2 | 11/2024 |

OTHER PUBLICATIONS

Huang et al. (CN 101444220), English translation (Year: 2008).*
Momentive1 (https://cpda.com/wp-content/uploads/2017/ 06/Silwet-408-SDS.pdf, date of issue, 2015) (Year: 2015).*
Luo et al. (CN 102640753, Aug. 22, 2012), English translation (Year: 2012).*
Rush (https://www.greencitytimes.com/a-review-of-dimethyl-sulfoxides-effect-on-green-plant-regeneration/, 2024) i (Year: 2024).*
Stevens (Pesticide Science, 1993), (Year: 1993).*
Momentive2 (Label, product sheet 2015). (Year: 2015).*

* cited by examiner

*Primary Examiner* — Umamaheswari Ramachandran

(74) *Attorney, Agent, or Firm* — Hayes Soloway P.C.

(57) ABSTRACT

The present disclosure relates to an aqueous biocidal composition and its non-therapeutic use for controlling and/or killing a pest present at a locus. The aqueous biocidal composition is applied to at least a portion of the locus. The aqueous biocidal composition comprises polyalkyleneoxide modified heptamethyl tri-siloxane in a range of 0.2 to 2% w/w and dimethyl sulfoxide in a range of 0.03 to 0.05% w/w.

6 Claims, 3 Drawing Sheets

AQUEOUS BIOCIDAL COMPOSITION

CROSS REFERENCE TO RELATED APPLICATION AND PRIORITY

The disclosure of the present Application is a continuation of International Patent Application No. PCT/IB2025/054529 filed Apr. 30, 2025, which claims priority from Indian Patent Application number 202521012182 having priority date of Feb. 13, 2025, incorporated herein by a reference.

FIELD OF THE INVENTION

The present disclosure pertains to the field of agricultural science and household pest management. More specifically, the present disclosure relates to an aqueous biocidal composition offering a safe, efficient, and long-lasting solution to control the growth of harmful pests or insects, thereby enhancing the quality of life for individuals and communities alike.

BACKGROUND OF THE INVENTION

Biocides or pesticides encompass a broad range of compounds, including herbicides, insecticides, fungicides, and rodenticides, each tailored for targeted control, and are commonly used to eliminate or inhibit the growth of harmful microorganisms in industrial, agricultural, and domestic environments.

Pest infestations can have significant negative impacts on both agriculture and household environments. In agriculture, pests such as cotton bollworms, aphids, whiteflies, *thrips*, and caterpillars cause substantial damage to economically important crops like cotton, brinjal, okra, tomato, chili, soybean, chickpea, and cabbage. These pests threaten crop yields and quality, affecting food security and farmer livelihoods. Similarly, in household environments, pests like ants, cockroaches, flies, mosquitoes, bedbugs, and termites create discomfort, health risks, and property damage.

Traditional pest control methods, such as the use of chemical pesticides and heat treatments, have long been employed to manage pest populations in agriculture and households. However, these approaches pose several disadvantages. The overuse of chemical pesticides not only harms beneficial insects and disrupts ecosystems but also contaminates soil and water sources, affecting both human health and the environment. Moreover, heat treatments, while chemical-free, can be costly, labor-intensive, and ineffective for deeply embedded infestations, limiting their overall reliability.

Effective pest management is essential in agriculture to protect crops and ensure sustainable production. For household pest control, the focus is on eliminating pests while ensuring safety for humans, pets, and the environment. For agricultural pest control, the focus is on eliminating pests while ensuring the safety of crops.

Chemical biocides such as imidacloprid, chlorantraniliprole, ethion, fipronil, and spinosad are widely used in agriculture. These compounds target a broad range of pests and are essential for maintaining crop health. For home use, biocides such as permethrin, boric acid, diatomaceous earth, and pyrethrins are commonly employed to control household pests, from ants to mosquitoes. Although these compounds are effective in controlling pests, they must be used responsibly to avoid toxicity risks to non-target organisms and prevent the release of harmful residues on crops, soil degradation, and contamination of water sources.

In addition to the above-discussed precautions, the use of chemical biocides, whether in agriculture or at home, faces several challenges, such as the development of resistance to the biocide composition over time. In both settings, pests exposed to a single biocide may evolve resistance, reducing its effectiveness. This is problematic in agriculture, where resistant pest populations can cause severe crop losses, as well as for household pests, which may become resistant to commonly used products, leading to ineffective control. Thus, the rapid development of resistance to common biocides complicates the challenge, leading to increased treatment costs and the potential for widespread infestations.

Thus, the rapid development of resistance to commonly used biocides by the pest population has become a growing concern. As pests evolve resistance, the effectiveness of these treatments diminishes, resulting in the need for higher pesticide dosages or more frequent applications.

Given these challenges, researchers have increasingly turned to combinations of insecticides with different modes of action. The different combinations used in both biocidal and household pest control can improve effectiveness by targeting pests in multiple ways, but resistance can still develop over time. Further, integrated pest management has been explored by many researchers. Different compounds in the integrated pest management are known in the prior art; however, their mode of action primarily relies on the use of toxic chemicals such as sol-gel and fipronil, which require chemical support.

The current trend in the pest control industry emphasizes physical methods that eliminate insects through non-toxic mechanisms such as suffocation, rather than relying on chemical toxicity. Notably, in 1947, the U.S. Environmental Protection Agency (EPA) approved the use of potassium salts of fatty acids derived from natural oils, which were registered as "pesticide soaps."

Surfactants have long been utilized in agriculture not only to enhance the penetration of active ingredients but also in combination with conventional pesticides to improve efficacy. In efforts to advance physical pest control methods, various surfactants, including organosilicones, are under evaluation.

In state-of-the-art, one such approach is disclosed where an aqueous formulation containing organosilicone surfactants along with pesticides and matrix-forming, entrapment agents such as chitosan and sol-gel precursors is employed. The approach further incorporates conventional antimicrobials and pesticides to boost effectiveness. As a result, the formulation does not align with the strict definition of an inert, purely physical pest control system and thereby fails to comply with the standard protocol. Moreover, the stabilization of such a complex formulation containing numerous compounds presents a significant challenge.

In another state-of-the-art, a composition for immobilizing insects is disclosed. The composition comprises the use of two different organosilicone surfactants in equal proportions, which provide a desired impact. However, the composition further requires stabilizing agents or solvents necessary to stabilize the product and maintain a good shelf life. Moreover, the formulation includes 0.03 to 5% w/w by weight of agriculturally active ingredients to enhance performance, which in turn contradicts the concept of a non-toxic, inert physical pesticide. The incorporation of additional active ingredients suggests a deficiency in the efficacy of a single active ingredient to achieve the desired pesticidal effect.

In another state-of-the-art, a formulation of a pesticide having a physical mode of action comprising siloxane, alkoxide, and matrix-forming agents with fipronil is disclosed. Although the formulation has a physical mode of action, it still depends on chemical agents such as matrix-forming agents, fipronil for its functionality. The formulation does not explicitly demonstrate a purely physical mode of action, as the presence of chemical components suggests that the pesticide's effectiveness is at least partially derived from chemical interactions rather than purely mechanical or structural means.

Thus, a biocidal composition with an elementary formulation comprising minimal components is highly desirable, as it ensures ease of maintenance, reduced chemical toxicity, and environmental safety. Such streamlined compositions not only minimize potential health and ecological risks but also enhance product stability and scalability. By focusing on essential, non-toxic ingredients, it is possible to achieve effective pest control while maintaining a safer, more sustainable alternative to conventional chemical pesticides.

Therefore, there is a long-felt need for a biocidal composition that can provide effective, safe, economic, and sustainable pest control in both biocidal and household environments. Such products must not only protect crops and homes but also minimize environmental impact, reduce toxicity risks, and provide long-term solutions for pest management.

SUMMARY OF THE INVENTION

This summary is provided to introduce concepts related to biocidal composition. This summary is not intended to identify essential features of the claimed subject matter nor is it intended for use in determining or limiting the scope of the claimed subject matter.

An aspect of the instant disclosure relates to an aqueous biocidal composition for controlling and/or killing a pest present at a locus. The aqueous biocidal composition comprises a polyalkyleneoxide modified heptamethyl trisiloxane in a range of 0.2 to 2% w/w, and dimethyl sulfoxide in a range of 0.03 to 0.05% w/w.

Another aspect of the instant disclosure relates to a method of treating pests at a locus containing or susceptible to the presence of a pest. Herein, the method comprises a step of applying to at least a portion of the locus an aqueous biocidal composition. Herein, the aqueous biocidal composition comprises polyalkyleneoxide modified heptamethyl tri-siloxane and dimethyl sulfoxide.

A further aspect of the instant disclosure relates to a biocidal composition that may be applied against a wide range of plant bacteria, fungi, insects, and/or viruses across multiple domestic, household, agricultural, horticultural, industrial, and environmental settings.

BRIEF DESCRIPTION OF THE DRAWINGS

Figure 1A:
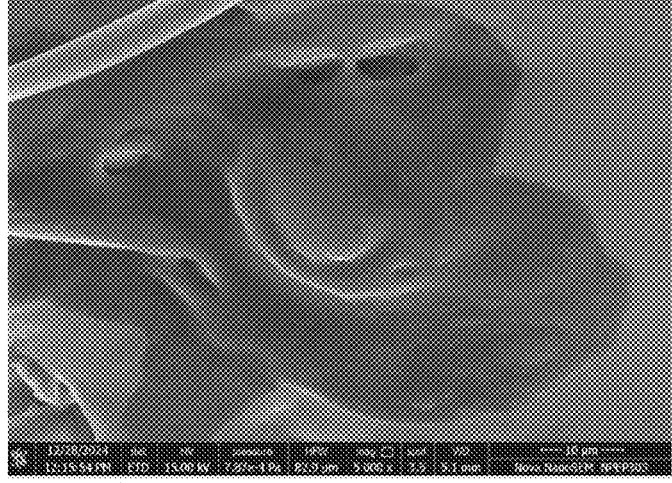
Figure 1B:
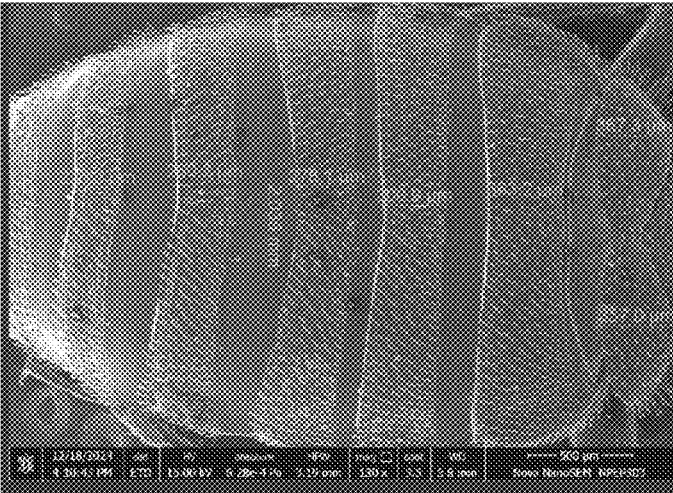
Figure 2A:
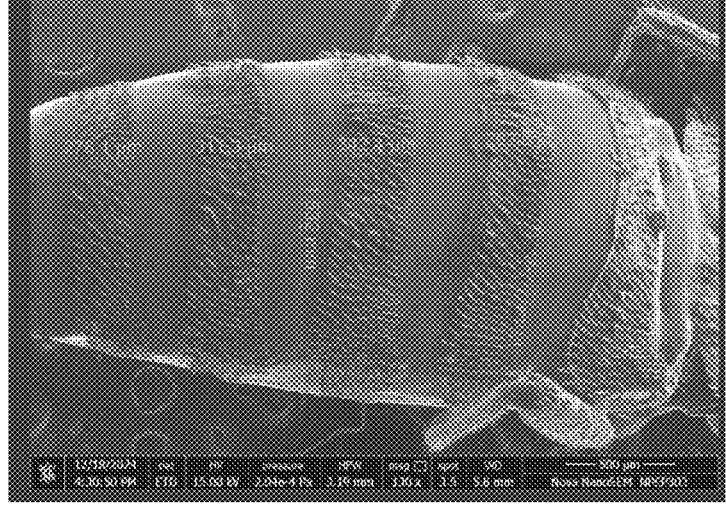
Figure 2B:
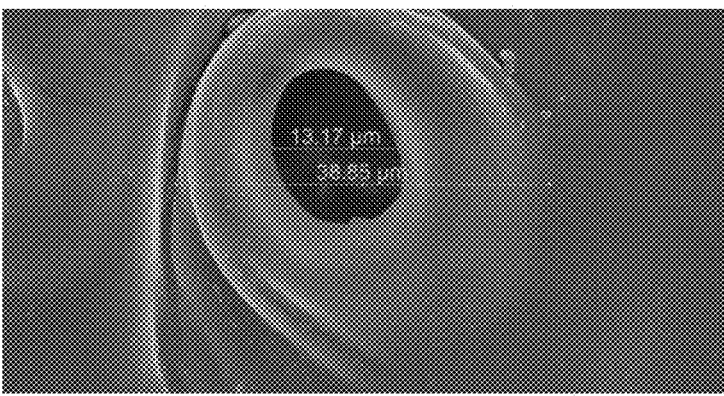

Having thus described the disclosure in general terms, references will now be made to the accompanying figures, wherein:

FIGS. 1A and 1B show SEM images of the untreated *Cimex hemipterus* (bed bugs); and FIGS. 2A and 2B show SEM images of the *Cimex hemipterus* (bed bugs) treated by the aqueous biocidal composition.

Figure 3:
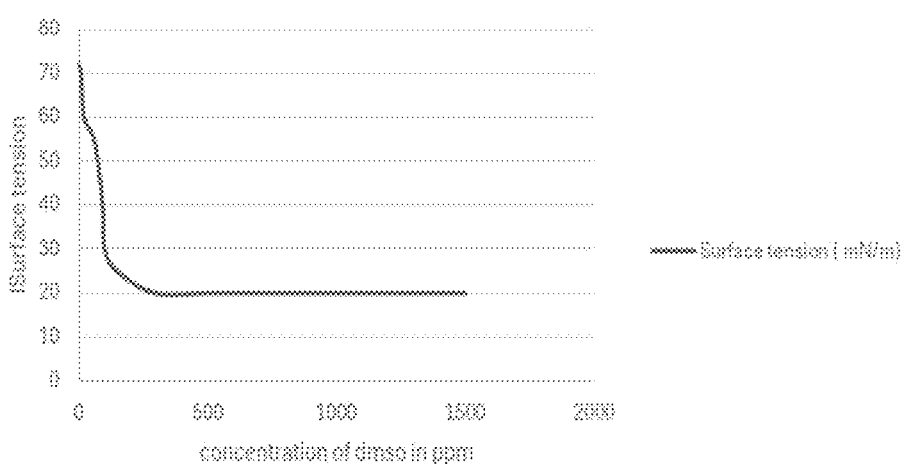

FIG. 3 illustrates a graphical representation of the relationship between surface tension and aqueous biocidal composition with varying concentration of DMSO.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

As used in the specification and claims, the singular forms "a", "an" and "the" include plural references unless the context clearly dictates otherwise. For example, the term "an article" may include a plurality of articles unless the context clearly dictates otherwise. Those with ordinary skill in the art will appreciate that the elements in the figures are illustrated for simplicity and clarity and are not necessarily drawn to scale. For example, the dimensions of some of the elements in the figures may be exaggerated relative to other elements, to improve the understanding of the present disclosure. There may be additional components described in the foregoing application that are not depicted in one of the described drawings.

Reference throughout the specification to "various embodiments," "some embodiments," "one embodiment," "alternate embodiment," or "an embodiment" means that a particular feature, structure, or characteristic described in connection with the embodiment is included in at least one embodiment. Thus, the appearances of these phrases are not necessarily all referring to the same embodiment. Furthermore, the particular features, structures, or characteristics may be combined in any suitable manner in one or more embodiments.

Reference throughout the specification to "components," "features," or "structure" means a constituent or group of constituents embodying the process. Before the present process is described, it is to be understood that this disclosure is not limited to the particular process described, as there can be multiple possible embodiments that are not expressly illustrated but may still be practicable within the scope of the present disclosure.

As used in the specification, the disclosure is intended to disclose various embodiments and aspects of the disclosure, which may include but are not limited to an agricultural and household pest management composition.

The present disclosure pertains to the field of pest management. More specifically, the present disclosure relates to an aqueous biocidal composition and a method for using thereof. The biocidal composition incorporates nontoxic compounds and targets the life stages of the target species while minimizing harmful impacts on non-target species and human populations.

For the purpose of instant disclosure and as is perceivable to a person skilled in the art, the term "biocidal composition" pertains to a composition, a formulation, or a mixture designed to exert a harmful or lethal effect on living organisms, typically for purposes of control or prevention and to manage and mitigate the impact of microorganisms, pests, and other harmful organisms. The biocidal composition may include, but is not limited to, disinfectants, pesticides, preservatives, fungicides, nematicides, insecticides, acaricides, herbicides, and bactericides. Herein, the biocidal composition is interchangeably referred to as 'aqueous biocidal composition', 'aqueous composition' or 'the composition'.

For the purpose of the present disclosure and as understood by a person skilled in the art, the term "target species" refers to a broad range of living organisms, including but not limited to insects, pests, arthropods, and other invertebrates, whether crawling, flying, or otherwise mobile. This definition may also encompass organisms that pose a threat to agriculture, stored products, public health, or other environments requiring pest management.

For the purpose of the present disclosure and as understood by a person skilled in the art, the term "non-target species" broadly refers to organisms that may inadvertently come into contact with the formulation. This includes, but is not limited to, vectors such as pets, livestock, wildlife, crops, plants, and humans that carry target species. The definition encompasses any living entity that is not the intended pest target but may be exposed to the pesticide during application or use.

Preferably, the aqueous biocidal composition is used as pesticides and/or insecticides, ensuring their effectiveness in managing various pests and harmful organisms. Moreover, the aqueous biocidal composition is specifically designed to protect crops, control disease vectors, and safeguard public health and infrastructure. Herein, the aqueous biocidal composition is a proper formulation that enhances the stability, safety, and delivery of the agents, optimizing their performance while minimizing environmental impact and human exposure.

In one aspect of the disclosure, an aqueous biocidal composition is disclosed.

In an embodiment, the aqueous biocidal composition may comprise at least one solvent. For the purpose of instant disclosure and as is perceivable to a person skilled in the art, the term "solvent" pertains to any substance (molecule) with the ability to dissolve other substances (solutes) to form a solution/mixture. The solvent may be liquid, solid, semi-solid, or gas. Further, the solvent may be aqueous or organic, as is perceivable to a person skilled in the art, as per requirement(s). It is preferable for the solvent to be entirely aqueous in composition, thereby eliminating the need for any additional organic solvents.

Herein, the aqueous solvents are non-toxic, cost-effective, and environmentally friendly in nature, making them a safer alternative to organic solvents, which can pose health risks and environmental hazards. Additionally, the aqueous solvent is easy to handle, with lower flammability risks compared to organic solvents, reducing the likelihood of accidents. Furthermore, the aqueous solvent often enables the use of milder conditions, promoting energy efficiency and reducing the need for harsh chemicals, which benefits both human health and the environment.

Herein, the solvent may be present in a range of 80-100% w/w of the overall composition. As used herein, all numerical values or numerical ranges include integers within such ranges and fractions of the values or the integers within ranges unless the context clearly indicates otherwise. Thus, for example, reference to a range of 80-100%, includes 81%, 82%, 83%, 84%, 85%, 86%, 87%, etc., as well as 81.1%, 81.2%, 81.3%, 81.4%, 81.5%, etc., 82.1%, 82.2%, 82.3%, 82.4%, 82.5%, etc., and so forth.

In another embodiment, the biocidal composition may comprise a polyalkyleneoxide modified trisiloxane (interchangeably referred to as organo-siloxane) to enhance pest control. Preferably, the polyalkyleneoxide modified trisiloxane is [Hydroxy (polyethyleneoxy) propyl]heptamethyl-trisiloxane.

Herein, the addition of organo-siloxane to water significantly reduces surface tension to exceptionally low levels. This reduction enhances the ability of the aqueous biocidal composition solution to penetrate fine cavities and microscopic openings. When sprayed onto target species, the improved spreadability allows the solution to infiltrate the tracheal system, leading to suffocation, rapid knockdown, and eventual mortality.

For both agriculture and household use, the composition can reduce the required dosage and application frequency, making them more environmentally friendly and cost-effective. Additionally, by targeting pests through different modes of action, the composition can delay or prevent resistance, ensuring continued efficacy over time.

In a related embodiment, the polyalkyleneoxide modified heptamethyl tri-siloxane is present in the composition in a range of 1-20% w/w by weight of the overall composition, preferably 1-10% w/w by weight, and more preferably around 1-5% w/w by weight of the overall composition. As used herein, all numerical values and ranges include integers within such ranges and fractional values unless explicitly stated otherwise. For example, reference to a range of 1-20% w/w encompasses 1%, 2%, 3%, 4%, 5%, and so on, as well as fractional values such as 1.1%, 1.2%, 1.3%, up to 19.9%. This flexibility in concentration allows for precise formulation adjustments to optimize performance based on specific application requirements.

Further, the overall polyalkyleneoxide modified heptamethyl tri-siloxane used herein is said to have a purity of 57-99%, preferably 90-99%, and more preferably 96-98%.

In yet another embodiment, the biocidal composition may comprise dimethyl sulfoxide (DMSO). Herein, the DMSO contributes to decreasing surface tension along with the supplementary benefit of stabilizing the aqueous biocidal composition for long-term storage, thereby eliminating the need for additional components such as stabilizers. Herein, the addition of DMSO led to additional reduction in surface tension, with maximum and optimal effects observed at concentrations ranging from 300 to 500 ppm, equivalent to 0.03 to 0.05% w/w. Below a concentration of 0.03% w/w, the composition exhibits no biocidal activity, whereas concentrations above 0.03% w/w result in instability of the composition.

Herein, adding 0.05% (500 ppm) DMSO to the aqueous mixture reduces the surface tension to 20 mN/m. Beyond this concentration, further DMSO addition does not decrease surface tension, indicating a plateau. Therefore, the optimal concentration range is identified as 0.03% to 0.05%.

The effectiveness of the composition is closely linked to the reduction in surface tension, primarily achieved through the addition of the polyalkyleneoxide modified heptamethyl tri-siloxane and DMSO in effective concentration. Herein, the lower surface tension enhances the penetration capability of the aqueous biocidal composition solution, allowing it to infiltrate the insect's tracheal system. This leads to suffocation and ultimately results in death by asphyxiation.

In another embodiment, the biocidal composition may comprise at least one antifoaming agent.

For the purpose of instant disclosure and as is perceivable to a person skilled in the art, the term "antifoaming agent" pertains to a chemical substance designed to prevent, reduce, or eliminate foam formation in liquid systems. It achieves this by disrupting the stability of foam bubbles, facilitating their collapse, and preventing excessive foaming.

In a related embodiment, the at least one antifoaming agent may include but is not limited to a mineral oil-based agent, a non-silicone-based agent, oil-based agents, surfactant-based agents, powdered agents, water-based agents, alkoxylated fatty alcohols and esters-based agents, polymer-based agents, or any combination thereof.

In an exemplary embodiment, the antifoaming agent may include but is not limited to mineral oils, vegetable oils, white oils, synthetic oils, ethylene oxide-propylene oxide (EO/PO) copolymers, non-silicone organic agents made from non-ionic surfactants, fatty acid or esters, hydrophobic silica, wax-coated silica, dispersions of hydrophobic particles, silicone-water emulsions, polyacrylate-based formulations, polyoxyethylene alkyl ethers, polyoxypropylene glycols, polyacrylates, polyethers.

Herein, the antifoaming agent may be present in a range of 0.1-10% w/w of the overall composition, preferably 0.1 to 0.5% w/w. As used herein, all numerical values or numerical ranges include integers within such ranges and fractions of the values or the integers within ranges unless the context clearly indicates otherwise. Thus, for example, reference to a range of 1-10% w/w, includes 1%, 2%, 3%, 4%, 5%, 6%, 7%, etc., as well as 1.1%, 1.2%, 1.3%, 1.4%, 1.5%, etc., 2.1%, 2.2%, 2.3%, 2.4%, 2.5%, etc., and so forth.

Herein, the composition is free of any additional active ingredients, ensuring the biocidal composition remains simple, focused, and safe for the intended application. By excluding unnecessary active components, the risk of potential interactions, side effects, toxicity, or instability is significantly reduced. This streamlined approach also enhances the reproducibility and consistency of the biocidal composition, making it both effective, economic, and reliable for its specified use.

In a further embodiment, the biocidal composition may optionally comprise at least one additive.

For the purpose of instant disclosure and as is perceivable to a person skilled in the art, the term "additive" pertains to a substance that is added to another substance in small amounts to change its properties.

In a related embodiment, the additive may be at least one of the emulsifier(s), adjuvants(s), acids or bases and buffers, oxidizers, dispersants, complexing agents, surfactants, corrosion inhibitors, stabilizer, essential oils, non-essential oils, synergists, agonists, activators, or combinations thereof, etc. as is perceivable to a person skilled in the art, as per requirement(s).

Another aspect of the instant disclosure relates to a method for preparing a biocidal composition described above.

An embodiment of the instant disclosure relates to a method for preparing an aqueous biocidal composition. The method may comprise a step of mixing a polyalkyleneoxide modified heptamethyl tri-siloxane, DMSO, and water to obtain the aqueous biocidal composition.

In a related embodiment of the instant disclosure, a method for preparing an aqueous biocidal composition involves mixing a synergistically effective concentration of polyalkyleneoxide modified heptamethyl tri-siloxane and DMSO. The mixture is then diluted with a solvent to produce a biocidal formulation, which is applied at an effective concentration to control target species. The synergistic effect of the composition improves overall efficacy. In a preferred embodiment, the method for preparing an aqueous biocidal composition involves mixing 0.2 to 2% w/w of polyalkyleneoxide modified heptamethyl tri-siloxane and 0.03 to 0.05% w/w DMSO. The mixture is then diluted with water to produce a biocidal emulsion, which is applied at an effective concentration to control target pests.

In a related embodiment, the mixing is carried out in a reaction vessel.

For the purpose of instant disclosure and as is perceivable to a person skilled in the art, the term "reaction vessel" pertains to a container used in chemical processes to hold and facilitate the reaction of substances under controlled conditions. It may be typically designed to withstand specific pressures and other environmental conditions that may occur during the reaction. It may vary in shape, size, and material depending on the scale and type of reaction being conducted, and it may often be equipped with features such as stirring mechanisms, temperature controls, and inlet/outlet ports for adding or removing reactants or products. It may be commonly used in laboratory, industrial, and pilot-scale chemical reactions.

In a related embodiment, the mixing is carried out using perceivable mixing means such as a mixer or a reaction vessel with an agitator.

In another related embodiment, the mixing may be carried out such that the polyalkyleneoxide modified heptamethyl tri-siloxane, described above, is partially or completely dissolved in the water, described above.

Another embodiment of the instant disclosure relates to a method for preparing a biocidal composition, comprising adding at least one antifoaming agent and optionally at least one additive to the mixture, to obtain the aqueous biocidal composition.

In a related embodiment of the instant disclosure, a method for preparing an aqueous biocidal composition involves mixing a synergistically effective concentration of polyalkyleneoxide modified heptamethyl tri-siloxane, DMSO, and at least one antifoaming agent. The mixture is then diluted with a solvent to produce a biocidal composition, which is applied at an effective concentration to control target species. The synergistic effect of the composition improves overall efficacy.

In yet another embodiment, the method for preparing a biocidal composition may be carried out as a small, medium, or large-scale process. Further, each or some embodiments of the subject disclosure may be automated, semi-automated, or manual.

In an embodiment, the biocidal composition may be a liquid, gel, semi-solid, gas, or solid. Preferably, the biocidal composition may be a liquid. In a related embodiment, the biocidal composition may be applied to a wide range of plants including but not limited to fruits, vegetables, cereals, oilseeds, etc. as are perceivable to a person skilled in the art; and preferably, sugarcane, rice, cotton, mango, banana, maize, soyabean, wheat, tobacco, coconut, cassava, chilli, and all crawling and flying insects bed bugs (*Cimex lectularius*), bugs (hemiptera), moths and butterflies (Lepidoptera), flies (diptera), *Thrips* (thysanoptera), termites (isoptera), cockroaches (Dictyoptera), Ants and Bees (Hymenoptera), and roundworm (nematodes).

In another related embodiment, the biocidal composition fulfills quality control standard(s); preferably, quality control standard(s) of conventionally known properties/characteristics such as pH, viscosity, density, efficacy, safety, etc.

In yet another related embodiment, the biocidal composition is non-hazardous, odourless, inflammable, and non-toxic to the non-target species. Herein, the odourless and inflammable property of the biocidal composition is achieved as the components are used in a minimal quantity and diluted form.

In yet another embodiment, the biocidal composition can be applied against a wide range of plant bacteria, fungus, insect, and/or viruses; including but not limited to White fly (*Bemisia tabaci*), Blast disease (*Pyricularia oryzae*), Red rot (*Colletotrichum falcatum*), Brown plant hopper (*Nilaparvata lugens*), Pink boll worm (*Pectinophora gossypiella*), Yellow rust (*Puccinia striiformis*), Rugose spiraling whitefly (*Aleurodicus rugioperculatus*), Swarming caterpillar (*Spodoptera mauritia*), Rhinoceros beetle (*Oryctes rhinoceros*), Grey leaf spot, Banana skipper (*Erionota thrax*), Mango nut weevil (*Sternochetus mangiferae*), Wheat Blast like disease (*Magnaporthe oryzae* sub sp. *triticum*), Rugose spiraling white fly (*Aleurodicus rugioperculatus*), Army worm (*My-*

*thimna separata*), Hairy caterpillar (*Spilosoma obliqua*), Panama wilt, Wheat Blast like disease (*Magnaporthe oryzaesub* sp. *triticum*), Mythimna seperate, Apple scab, Tobacco Leaf eating caterpillar, *Fusarium* wilt, Yellow rust (*Puccinia stiirformis*), Cassava mealy bug, White fly, leaf curl, fruit rot, Bacterial streak, Invasive chilli, White grub, Sigatoka Disease, Cucumber Mosaic Virus (CMV), Southern Rice Black Streaked Dwarf Virus (SRBSDV), Leaf Folder Rice, Giedle beetle, Semilooper, Stem fly, *Spodoptera litura*, Wilt & Pod borer Pigeonpea, Wilt & Pod borer, Yellow Stem borer (*Scirpophaga incertulas*), Earhead caterpillar (*Leptocorisa acuta*), Semi looper, Girdle beetle, Stem fly, *Helicoverpa, Spodoptera litura*, Stem fly, Yellow Mosaic Virus, Wilt, Pod borer, and/or Pod fly Pigeon. Preferably, the biocidal composition can be applied against all insects, crawling, flying, their eggs, and their larvae, and all stages of young ones like nymphs in bed bugs. Thus, the aqueous biocidal composition exhibits larvicidal and ovicidal activity.

A further aspect of the instant disclosure relates to the application of the biocidal composition described above. Herein, the method of treating pests at a locus containing or susceptible to the presence of a pest is disclosed. Herein said method comprises applying to at least a portion of said locus an aqueous biocidal composition comprising polyalkyleneoxide modified heptamethyl tri-siloxane and dimethyl sulfoxide.

In a related embodiment, the mode of application of the biocidal composition depends on the target species and the environment. The method for applying the prepared biocidal composition may be manual, semi-automatic, or automatic. It can be applied through spraying, fogging, dipping, coating, or direct incorporation into materials. Preferably, the biocidal composition is applied through spraying.

For agricultural use, foliar spraying or soil drenching ensures effective coverage and uptake. In industrial and medical settings, surface disinfection through wiping or aerosol dispersion is common. For water treatment, biocidal agents can be introduced via direct dosing or slow-release formulations. The application method should ensure optimal efficacy while minimizing environmental impact and resistance development. For household applications, the biocidal composition can be used through various methods to ensure effective disinfection and pest control.

In another embodiment, the aqueous biocidal composition as described herein is used to inhibit, repel, or eliminate target pests while minimizing impact on non-target species. The composition as described herein, wherein the composition is applied as a spray, coating, or bait for effective pest management.

Preferably, the biocidal composition is applied through spraying. Upon spraying of the biocidal composition, target species may experience immobilization, paralysis, and immediate death due to suffocation as the aqueous media enters the tracheal network. The treated species may exhibit distinct morphological changes compared to the control group, appearing elongated with a reduced width and an extended, globular thorax, whereas the untreated species retain their flattened abdomen.

In a related embodiment, the composition may exhibit storage stability for up to 2 years under varying environmental conditions. The composition may remain effective and maintain its physical and chemical integrity when stored at temperatures ranging from −8° C. to 45° C., ensuring long-term usability and consistency.

The biocidal composition may be applied as part of natural pesticide strategies, including Integrated Pest Management (IPM), Biological Control, Botanical Pesticides, and Eco-friendly Pesticides. These approaches aim to sustainably manage pest populations while minimizing environmental impact and reducing reliance on synthetic chemicals.

Further, for a better understanding of the present disclosure and associated method, the following examples are discussed.

Example 1: Different Concentrations of Polyalkyleneoxide Modified Heptamethyl Tri-Siloxane in the Aqueous Biocidal Composition The evaluation of biocidal efficacy is critical in determining the appropriate formulation for various pesticidal applications. A key measure of this efficacy is the knockdown time, which refers to the time it takes for a biocidal composition to significantly reduce or neutralize pesticidal activity.

The present disclosure provides an illustrative example of the knockdown times (refer to table 2) associated with the aqueous biocidal composition comprising [Hydroxy(polyethyleneoxy)propyl]heptamethyltrisiloxane (polyalkyleneoxide modified heptamethyl tri-siloxane) at three different concentrations: 0.625%, 1.25%, and 1.875% along with 0.03% w/w DMSO (refer to table 1).

TABLE 1

| Composition of aqueous biocidal compositions | |
| --- | --- |
| Composition | Ingredient (% w/w) |
| A | Polyalkyleneoxide modified heptamethyl tri-siloxane (0.65%) + DMSO (0.03%) |
| B | Polyalkyleneoxide modified heptamethyl tri-siloxane (1.25%) + DMSO (0.03%) |
| C | Polyalkyleneoxide modified heptamethyl tri-siloxane (1.875%) + DMSO (0.03%) |

TABLE 2

| Impact on different species of the aqueous biocidal composition | | | | |
| --- | --- | --- | --- | --- |
| Species | A | B | C | Mortality at 24 hrs |
| | Knockdown time (seconds) | | | |
| *Periplanata americana* | 205.33 | 217 | 41.67 | 100% |
| *Blattlla germinaca* | 216 | 91 | 61 | 100% |
| *Cimex hemipterus* | | | | |
| *Odontotermes obesus* termites | 68.33 | 32 | 16 | 100% |
| Black ant | 184.67 | 160 | 111.23 | 100% |
| Red ant | 152 | 52.33 | 30.67 | 100% |
| Ticks | >300 | >300 | >300 | Mortality 100% in 72 hours |
| *Musca domestica* | | 64 | 36.67 | 100% |
| Brown plant hopper | 161.33 | 119.67 | 89.33 | 100% |
| Yellow stem borer adults | 195.33 | 84 | 52 | 100% |
| *Helicoverpa argenera* adults | 215.33 | 83 | 57.67 | 100% |

It can be noted that the concentration of the aqueous biocidal composition comprising [Hydroxy(polyethyleneoxy)propyl]heptamethyltrisiloxane influences the rate at which microbial populations are neutralized. The potential of the aqueous biocidal composition C, comprising 1.875% polyalkyleneoxide modified heptamethyl tri-siloxane, can be interpreted from Table 2, which highlights reduced knockdown time. Data presented here underscores the importance of concentration of polyalkyleneoxide modified heptamethyl tri-siloxane in achieving rapid and effective microbial control, which is vital for enhancing the utility and performance of biocidal treatment in diverse environments.

Example 2: Impact of Different Concentrations of DMSO in the Aqueous Biocidal Composition The present disclosure provides an illustrative example of the aqueous biocidal compositions comprising 1.875% poly-alkyleneoxide modified heptamethyl tri-siloxane and DMSO of different concentrations (refer to Table 3). The compositions were prepared in an aqueous medium and applied to *Cimex lectularius* (bed bugs) to demonstrate the efficacy of the compositions, specifically the combined use and synergistic impact of DMSO and polyalkyleneoxide modified heptamethyl tri-siloxane in the defined ratio.

TABLE 3

Composition of aqueous biocidal compositions

| | DMSO (% w/w) | Polyalkyleneoxide modified heptamethyl tri-siloxane | Surface tension mN/m | Remarks |
|---|---|---|---|---|
| D | 0.03 | nil | 72 | No kill in 24 hours, ineffective by itself |
| E | nil | 1.875 | 30 | 100% knockdown & kill in 60 seconds |
| F | 0.04 | 1.875 | 22 | 100% knockdown and kill in 30 seconds |
| G | 0.02 | 1.875 | 28 | 100% knockdown & kill in 30 seconds |
| C | 0.03 | 1.875 | 20 | 100% knockdown & kill in 30 seconds |

It can be noted that the addition of DMSO in a proper amount can reduce surface tension from 72 mN/m to exceptionally low levels of approximately 20 mN/m. Thus, the aqueous biocidal composition C exhibited 100% knockdown & kill in 30 seconds.

Referring to the graph in FIG. 3, the relationship between surface tension and aqueous biocidal composition with varying DMSO concentration is illustrated. The graph shows that even at a concentration of 2000 ppm (0.2% w/w) of DMSO, the surface tension reaches a plateau, indicating the maximum reduction has been achieved at 500 ppm and that further increases in DMSO concentration do not result in additional surface tension reduction. Thus, beyond 500 ppm (0.05% w/w) of DMSO, no further reduction in surface tension was observed, as the graph plateaued.

Thus, the aqueous biocidal composition comprising 0.03% DMSO and 1.875% polyalkyleneoxide modified heptamethyl tri-siloxane is achieving the enhanced effect of 100% knockdown & kill in 30 seconds.

Example 3: Impact of Different Concentrations of DMSO and Polyalkyleneoxide Modified Heptamethyl Tri-Siloxane in the Aqueous Biocidal Composition The present disclosure provides an illustrative example of the aqueous biocidal compositions comprising polyalkyleneoxide modified heptamethyl tri-siloxane with varying concentration and DMSO of different compositions (refer to Table 4). The compositions were prepared in an aqueous medium and applied to *Cimex lectularius* (bed bugs) to demonstrate the efficacy of the compositions, specifically the combined use and synergistic impact of DMSO and polyalkyleneoxide modified heptamethyl tri-siloxane in the defined ratio.

TABLE 4

Composition of aqueous biocidal compositions

| S. No | Polyalkyleneoxide modified heptamethyl tri-siloxane (% w/w) + DMSO (ppm) | Surface tension mN/m |
|---|---|---|
| 1 | 0 | 72 |
| 2 | 0.10 + 10 | 70 |
| 3 | 0.15 + 20 | 60 |
| 4 | 0.20 + 60 | 55 |
| 5 | 0.25 + 85 | 45 |
| 6 | 0.30 + 95 | 38 |
| 7 | 0.45 + 100 | 30 |
| 8 | 0.65 + 150 | 25 |
| 9 | 1.2 + 300 | 20 |
| 10 | 1.87 + 500 | 20 |
| 11 | 2 + 1000 | 20 |
| 12 | 3 + 1500 | 20 |

It can be noted that the addition of DMSO and polyalkyleneoxide modified heptamethyl tri-siloxane in a proper amount can reduce surface tension from 72 mN/m to exceptionally low levels of approximately 20 mN/m, indicating the impact of the biocidal concentration on the surface tension. Thus, the aqueous biocidal compositions 9, 10, 11 & 12 exhibited reduced surface tension, which in turn improves the effectiveness of the composition by promoting better wetting, spreading, and penetration into the target species.

Example 4: Application of Aqueous Biocidal Composition C on Bed Bugs & Cockroaches Experiment 1: The application of the aqueous biocidal composition C to *Cimex hemipterus* (bed bugs) resulted in a measurable weight loss, indicating a compromise in the integrity of the exoskeleton. This condition led to the leakage of hemolymph, suggesting a critical failure that is likely to result in immediate mortality.

Experiment 2: Further, five groups of adult bed bugs, consisting of both male and female specimens, with fifteen individuals in each group, were fed and subsequently maintained for a period of seven days. On the seventh day, each group was subjected to spraying, and mortality was recorded. Following a 24-hour drying period on filter paper, the weights of the bed bugs were documented. A weight loss of 0.32% was observed post-spraying, confirming the loss of hemolymph.

Experiment 3: To further substantiate these findings, five starved adult *Periplaneta americana* (American cockroaches) were administered an aqueous solution of methylene blue and maintained for 24 hours to observe their normal behavior. Subsequently, they were sprayed with the aqueous biocidal composition C solution. The cockroaches were placed in a lucid ring on a glass sheet covered with white filter paper and observed.

TABLE 5

| S. No. | Application of Methylene Blue | Observations |
|---|---|---|
| | Observations of Experiment 3 | |
| 1 | *Periplaneta americana* before being treated with the biocidal composition | The filter paper remains white |
| 2 | *Periplaneta americana* post-treatment of the biocidal composition | The filter paper turned light blue |

It was noted that after the insects were incapacitated by the spray, the filter paper have turned light blue, indicating that hemolymph had leaked from the insects and been absorbed by the paper. Moreover, the affected insects revealed a blue tinge on the carapace, suggestive of exo-skeletal destruction. Additionally, the gastrointestinal tracts of some specimens were extruded from the anal opening as a result of the traumatic impact.

Referring to FIGS. 1A and 1B & 2A and 2B, the SEM images of untreated and treated bed bugs are illustrated. It can be noted that the shape of the bed bug has changed and become elongated. The width of the untreated control is 2.5 mm, post spraying of the aqueous biocidal composition C the width reduces to 1.5 mm with an elongated thorax and abdomen. The experimental findings suggest a significant loss of hemolymph, which is crucial for nutrient circulation and internal pressure regulation. This disruption, likely caused by osmotic imbalance, results in measurable weight loss post-treatment.

Thus, examination under scanning electron microscopy (SEM) revealed that the spiracles-critical respiratory openings located on the thorax and abdomen-were in an open position, indicating a loss of muscle control necessary for their closure. This failure to respond to external threats leads to disruption in respiratory regulation and consequent loss of hemolymph, resulting in rapid mortality.

Example 5: Comparative Study of the Aqueous Biocidal Composition C with Other Biocidal Compositions Various samples were prepared utilizing polyalkyleneoxide modified heptamethylene siloxane and polyalkyleneoxide modified heptamethyl tri-siloxane, both individually and in combination. The knockdown efficacy of these compositions was subsequently compared with that of the aqueous biocidal composition (refer to Table 6).

TABLE 6

Impact of the biocidal composition

| Sample | Component | Concentration (% w/w) | Knockdown in 30 sec | Impact |
|---|---|---|---|---|
| 1 | Hydroxy (polyethyleneoxy) propyl] heptamethyltrisiloxane (CAS No.: 67674-67-3) + 2-[Methoxy (polyethyleneoxy) propyl] heptamethyltrisiloxane (CAS No.: 27306-78-1) | 0.5 + 0.5 | 95% | Knockdown achieved with equal components |
| 2 | Hydroxy (polyethyleneoxy) propyl] heptamethyltrisiloxane (CAS No.: 67674-67-3) | 1 | 65% | Ineffective singly |
| 3 | 2-[Methoxy (polyethyleneoxy) propyl] | 1 | 60% | Ineffective singly |

TABLE 6-continued

Impact of the biocidal composition

| Sample | Component | Concentration (% w/w) | Knockdown in 30 sec | Impact |
|---|---|---|---|---|
| | heptamethyltrisiloxane (CAS No.: 27306-78-1) | | | |
| 4 | Hydroxy (polyethyleneoxy) propyl] heptamethyltrisiloxane (CAS No.: 67674-67-3) + DMSO (aqueous biocidal composition) | 1.85 + 0.03 | 100% | Knockdown achieved using the composition |

In Sample 1, 95% knockdown was successfully achieved in 30 seconds when the components were combined. When tested individually (sample 2 & sample 3), each component was generally ineffective, suggesting that neither alone was sufficient to induce knockdown under standard conditions. However, the aqueous biocidal composition C (sample 4), comprising a single component and DMSO, 100% knock-down was observed.

The following advantages are offered by the present disclosure:

The composition operates via a physical mode of action—specifically by penetrating the insect's tracheal system—resulting in suffocation and death without the use of conventional toxic chemicals.

The combination of polyalkyleneoxide modified heptam-ethyl tri-siloxane and DMSO reduces surface tension from 72 mN/m to as low as 20 mN/m, enhancing the spreadability and penetration of the aqueous biocidal composition.

Reduced surface tension enables the composition to infil-trate fine crevices and the respiratory systems of insects, leading to rapid knockdown and mortality.

The defined combination of DMSO and polyalkyleneox-ide modified heptamethyl tri-siloxane in the composi-tion provides a synergistic effect, enhancing overall efficacy compared to individual components.

The formulation comprises minimal and stable compo-nents, making it easier to manufacture, maintain, and store.

The absence of harsh or toxic active chemicals improves safety for users and reduces environmental impact.

As the mode of action is physical, the composition may remain effective against pests that have developed resistance to chemical insecticides.

Surface tension plateaus at 2000 ppm of DMSO, indicat-ing an optimized concentration beyond which no fur-ther benefits are observed, supporting cost-effective usage.

The aqueous nature of the composition allows for easy application through conventional spraying methods.

The disclosed embodiments are illustrative and not intended to limit the scope of the disclosure. Variations and modifications that fall within the scope of the disclosure as defined are considered part of the present subject matter.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The foregoing description shall be interpreted as illustrative and not in any limiting sense. A person of ordinary skill in the art would understand that certain modifications could come within the scope of this disclosure. The features and properties of the present disclosure are described in further detail below with reference to examples.

The embodiments, examples and alternatives of the preceding paragraphs or the description and drawings, including any of their various aspects or respective individual features, may be taken independently or in any combination. Features described in connection with one embodiment are applicable to all embodiments unless such features are incompatible.

We claim:

1. An aqueous biocidal composition for controlling and/or killing a pest, comprising:

a [hydroxy (polyethyleneoxy) propyl] heptamethyltrisiloxane in a range of 0.2 to 2% w/w; and dimethyl sulfoxide in a range of 0.03 to 0.05% w/w, wherein the composition is free of any additional active ingredient.

2. The aqueous biocidal composition as claimed in claim 1, comprises an antifoaming agent selected from a group consisting of a mineral oil-based agent, a non-silicone-based agent, oil-based agents, surfactant-based agents, powdered agents, water-based agents, alkoxylated fatty alcohols and esters-based agents, polymer-based agents, or any combination thereof.

3. The aqueous biocidal composition as claimed in claim 1, wherein the composition is applied to insects, crawling, flying, their eggs, and their larvae, and all stages of young ones.

4. A method of treating pests, at a locus containing or susceptible to the presence of a pest, wherein the method comprises applying to at least a portion of the locus an aqueous biocidal composition comprising [hydroxy (polyethyleneoxy) propyl]heptamethyltrisiloxane in a range of 0.2 to 2% w/w; and dimethyl sulfoxide in a range of 0.03 to 0.05% w/w, wherein the composition is free of any additional active ingredient.

5. The method as claimed in claim 4, wherein the composition is applied via at least one of spraying or fogging, at the locus containing or susceptible to the presence of the pest.

6. The method as claimed in claim 4, having a knockdown level on treated pests is at a rate of at least about 99% within the period of less than about 60 seconds after treatment of the pest with the composition.

* * * * *